United States Patent
Tsuzuki

(10) Patent No.: US 8,138,730 B2
(45) Date of Patent: Mar. 20, 2012

(54) VOLTAGE CONTROLLER FOR VEHICLE USING AVERAGED STATUS SIGNAL

(75) Inventor: Tomomi Tsuzuki, Toyota (JP)

(73) Assignee: Denso Corporation, Kariya (JP)

( * ) Notice: Subject to any disclaimer, the term of this patent is extended or adjusted under 35 U.S.C. 154(b) by 794 days.

(21) Appl. No.: 12/230,311

(22) Filed: Aug. 27, 2008

(65) Prior Publication Data

US 2009/0058372 A1 Mar. 5, 2009

(30) Foreign Application Priority Data

Aug. 29, 2007 (JP) ................................ 2007-223217

(51) Int. Cl.
*H02P 9/00* (2006.01)
(52) U.S. Cl. ............................... 322/44; 322/18; 322/33
(58) Field of Classification Search ....... 290/40 A–40 F; 322/18
See application file for complete search history.

(56) References Cited

U.S. PATENT DOCUMENTS

| | | | |
|---|---|---|---|
| 4,877,273 A | 10/1989 | Wazaki et al. | |
| 5,020,491 A * | 6/1991 | Mashino | 123/192.1 |
| 6,271,649 B1 * | 8/2001 | Iwatani | 322/29 |
| 6,486,638 B1 | 11/2002 | Sumimoto et al. | |
| 7,038,428 B1 * | 5/2006 | Sasaki | 322/22 |
| 7,161,328 B2 | 1/2007 | Sumimoto et al. | |
| 7,528,585 B2 * | 5/2009 | Maehara | 322/59 |
| 2003/0025625 A1 | 2/2003 | Mizuno et al. | |
| 2008/0272717 A1 * | 11/2008 | Gleason et al. | 318/139 |

FOREIGN PATENT DOCUMENTS

| | | |
|---|---|---|
| JP | A-64-66432 | 3/1989 |
| JP | A-6-117288 | 4/1994 |
| JP | A-6-183231 | 7/1994 |
| JP | A-2001-258295 | 9/2001 |
| JP | A-2006-304503 | 11/2006 |
| WO | WO 2005/031964 A1 | 4/2005 |

OTHER PUBLICATIONS

Japanese Office Action for Application No. 2007-223217, Issued Jun. 30, 2009.
"Moving Average," Wikipedia, Retrieved from http://en.wikipedia.org/wiki/Moving_average on Aug. 4, 2010, pp. 1-6.
Extended European Search Report issued in European Application No. 08015141.8 dated Aug. 19, 2010.

* cited by examiner

*Primary Examiner* — Quyen Leung
*Assistant Examiner* — Thomas Truong
(74) *Attorney, Agent, or Firm* — Oliff & Berridge, PLC

(57) ABSTRACT

In a voltage controller for a vehicle, voltage controlling means controls an output voltage of a power generator mounted on the vehicle and a terminal voltage of a battery connected to the power generator, by controlling of a field current passing through a field winding of the power generator. This control is performed by operating switching means connected to the field winding so that the switching means is conducted intermittently. Signal generating means generates a power generator state signal by measuring a state of the power generator at predetermined measurement periods. Signal averaging means performs an exponentially weighted averaging of the power generator state signal. The signal averaging means executes the averaging within a predetermined averaging period and updates the averaging at every predetermined measurement period.

6 Claims, 4 Drawing Sheets

VOLTAGE CONTROLLER FOR VEHICLE USING AVERAGED STATUS SIGNAL

CROSS-REFERENCE TO RELATED APPLICATION

This application is related to Japanese Patent Application NO. 2007-223217 filed on Aug. 29, 2007, the contents of which are hereby incorporated by reference.

BACKGROUND OF THE INVENTION

1. Field of the Invention

The present invention relates to a voltage controller for a vehicle and in particular, to a voltage controller that controls an output voltage of a power generator for vehicles such as a car and a truck.

2. Description of the Related Art

Conventionally, a voltage of a power generator mounted on a vehicle is controlled based on a detected status signal of the generator in which the signal is averaged. For example, in International Publication No. WO2005/031964, a configuration is known in which a power generator state signal is generated by a conduction rate of a switching means (e.g. a duty ratio of a power transistor) connected to a field winding of a power generator for a vehicle. The conduction rate is measured for a predetermined period and an average value being calculated. The generated power generator state signal is transmitted from a regulator to an electronic control unit (i.e., ECU).

In a conventional method disclosed in International Publication No. WO2005/031964, the conduction rate is measured for the predetermined period and averaged. Therefore, the timing content of the power generator state signal is updated is each predetermined period. Even when the state of the power generator for a vehicle changes during the predetermined period, the change is not reflected in the power generator state signal in real-time. As a result, a problem occurs in that reliability of the power generator state signal is low. Because the ECU performs engine control based on an unreliable power generator state signal such as this, engine control becomes unstable. In a worst case scenario, engine control may stop. To prevent a situation such as this, the predetermined period is required to be shortened and the timing at which the content of the power generator state signal is updated is required to be made more frequent. However, in this case, the conduction rates obtained through measurement cannot be sufficiently averaged. Error increases because of the effects of noise and the like. The power generator state signals being outputted remain low in reliability, adversely affecting engine control.

SUMMARY OF THE INVENTION

The present invention has been achieved in light of the above-described issues. An object of the present invention is to provide a voltage controller for a vehicle that can improve reliability of a power generator state signal.

To solve the above-described issues, a voltage controller for a vehicle of the present invention comprises:

a voltage controlling means for controlling an output voltage of a power generator mounted on the vehicle and a terminal voltage of a battery connected to the power generator, by controlling a field current passing through a field winding of the power generator by operating a switching means connected to the field winding so that the switching means is conducted intermittently;

a signal generating means for generating a power generator state signal by measuring the state of the power generator at a predetermined measurement period;

a signal averaging means for performing an Exponentially Weighted Moving Averaging (herein after called EWM averaging) of the power generator state signal generated by the signal generating means wherein the signal averaging means executes the averaging within a predetermined averaging period and updates the averaging at the every predetermined measurement period.

Specifically, the signal generating means preferably generates at least one of a duty ratio of the switching means and a current value of a current flowing to the field winding as the power generator state signal, Alternatively, the signal generating means preferably generates at least one of a rotation frequency of the power generator for a vehicle, a temperature of the power generator for a vehicle, and an output voltage of the power generator for a vehicle as the power generator state signal. Because a result obtained by power generator state signals being averaged is transmitted to the external controller as a power generator control signal, details of a change can be reflected every time a state of the power generator for a vehicle changes. Reliability of the power generator control signal can be improved.

Preferably, the switching means repeatedly switches itself on and off at a predetermined cycle. As a result, measurement accuracy of the power generator state signal, contents of which are the duty ratio of the switching means and the current value of the current flowing to the field winding, can be increased.

The signal generating means preferably measures the duty ratio or the current value and generates the power generator state signal at the predetermined measurement period that is equal to the predetermined period of the switching means, regardless of whether the switching means is in operation or not. As a result of the duty ratio and the current value being measured in time with the predetermined period of the switching means, the accuracy of these measurements can be further increased.

The signal averaging means preferably changes an EWM averaging period depending on a state of the power generator for a vehicle. As a result, when required response characteristics differ based on the state of the power generator for a vehicle (for example, when the power generator rotation frequency is excessively high or low, or when the power generator temperature is excessively high or low), the averaging period can be changed, and a power generator state signal of an appropriate sensitivity can be outputted.

The signal averaging means preferably changes the EWM averaging period depending on a communication signal sent from the external controller. As a result, when required response characteristics differ depending on a vehicle state (for example, when the engine rotation frequency is excessively high or low, or when a coolant temperature is excessively high or low), a power generator state signal of an appropriate sensitivity can be outputted as a result of the averaging period being changed by an instruction from the external controller.

The signal averaging means preferably sets the EWM averaging period to a period corresponding to a time constant of the field winding. As a result of the averaging period of the power generator state signal, contents of which are the duty ratio of the switching means and the current value of the current flowing to the field winding, being set to a frequency corresponding to the time constant of the field winding, a power generator state signal having high measurement accuracy close to actual values can be outputted.

When the power generator state signals generated by the signal generating means have a same value that continues for a predetermined amount of time or a predetermined number of consecutive times, the signal averaging means outputs power generator state signals in which the same value is continued, instead of the averaged power generator state signal. As a result, a power generator state signal having high measurement accuracy close to actual values can be outputted by an averaging result being changed to 0% or 100%, when the duty ratio of the switching means is averaged and a 0%- or 100%-state continues for a predetermined amount of time or a predetermined consecutive number of times.

DETAILED DESCRIPTION OF THE PREFERRED EMBODIMENTS

Figure 1:
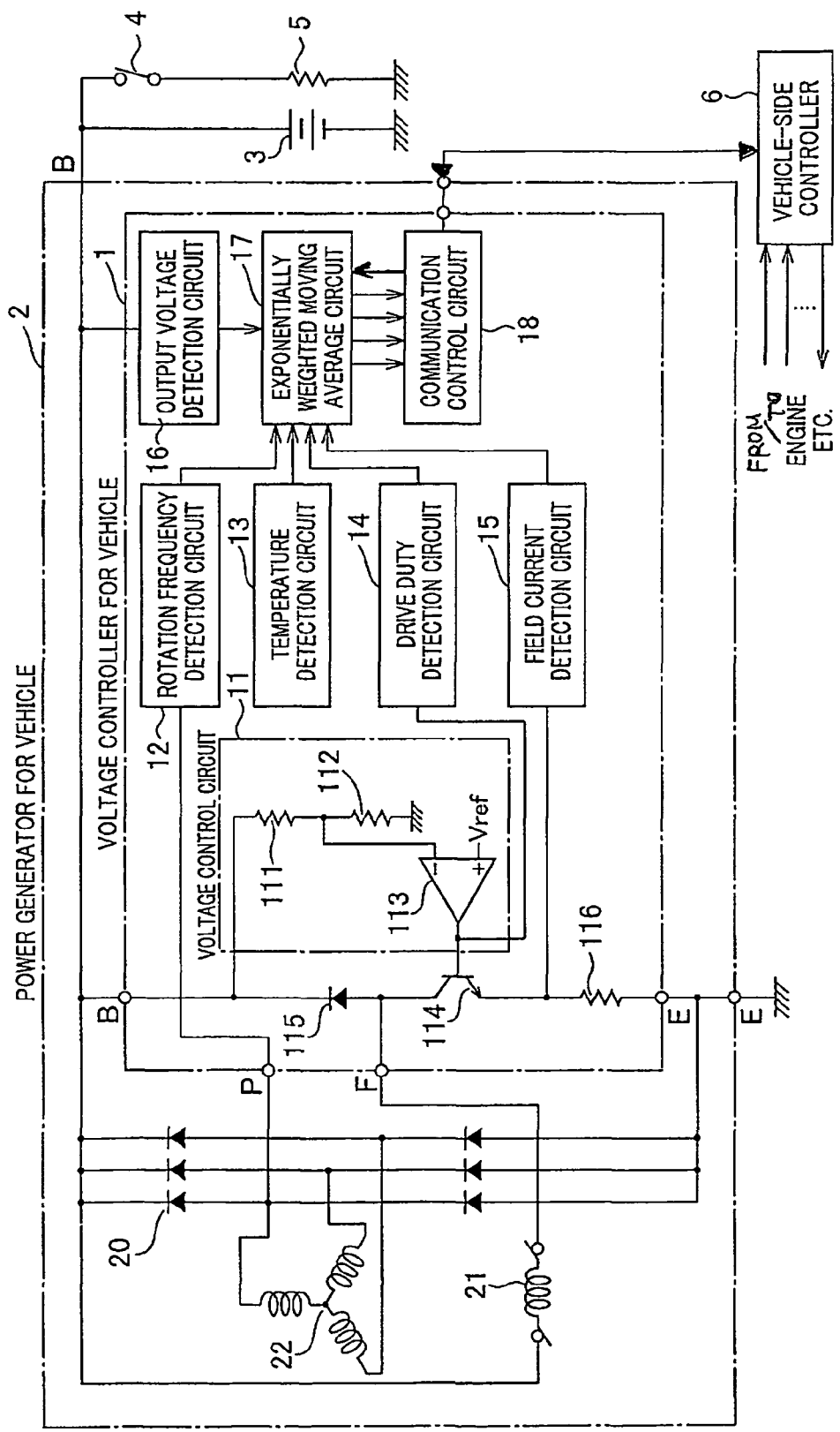
FIG. 1 is a diagram showing a configuration of a power generator for a vehicle including a voltage controller for a vehicle according to an embodiment.
Figure 2:
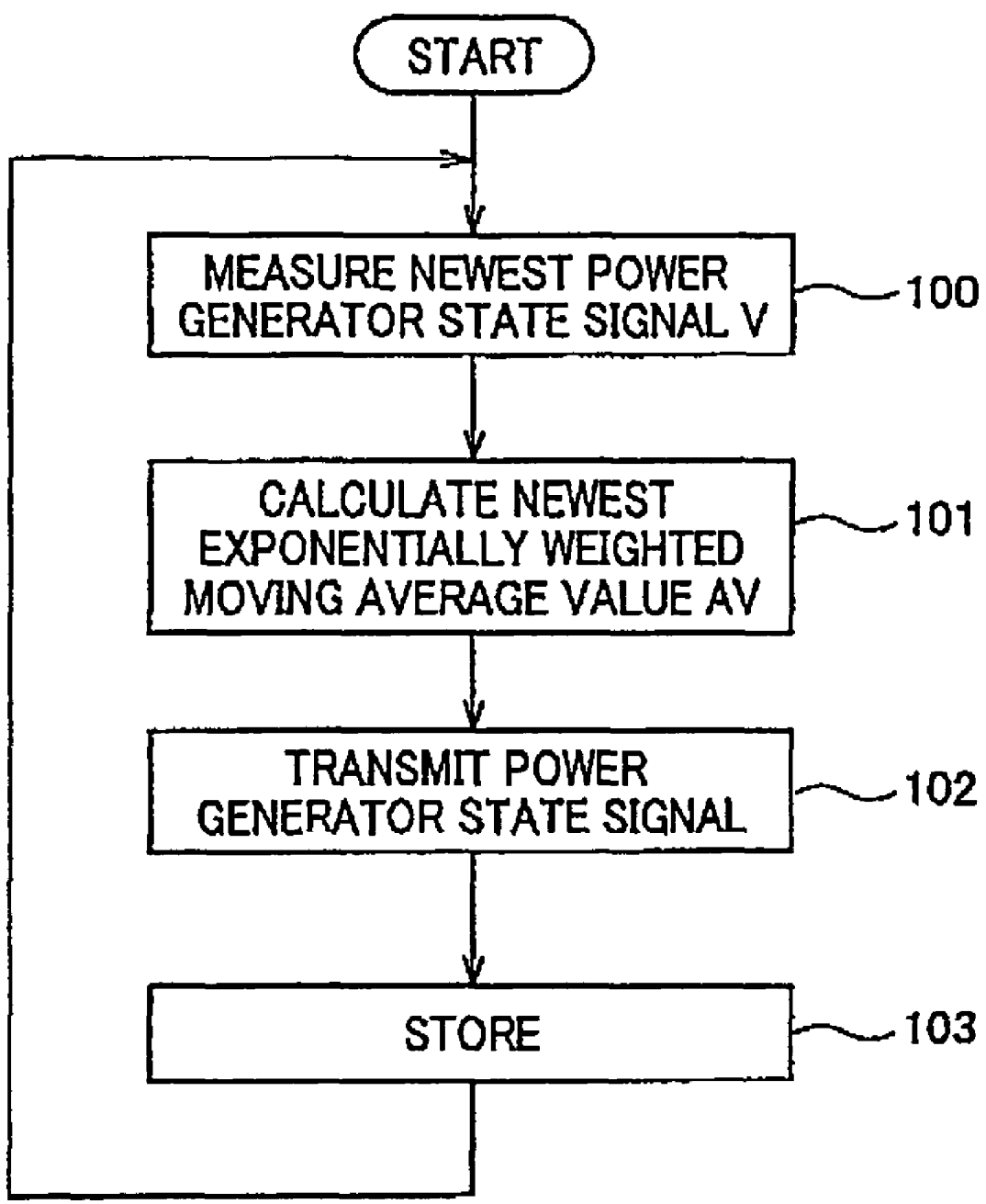
FIG. 2 is a flowchart showing operations performed by the voltage controller for a vehicle related to transmission of a power generator state signal.

A voltage controller for a vehicle according to an embodiment of the present invention will be described with reference to the drawings FIGS. 1 to 3. FIG. 1 is a diagram of a configuration showing a power generator for a vehicle including the voltage controller according to the embodiment. FIG. 1 also shows the connection between the power generator for a vehicle and a battery, an external controller, and the like. As shown in FIG. 1, a power generator 2 for a vehicle according to the embodiment includes a rectifier 20, a field winding 21, an armature winding 22, and a voltage controller 1 for a vehicle. The power generator 2 for a vehicle is driven by an engine, via a belt and a pulley.

The field winding 21 generates a magnetic field by being electrified. The field winding 21 is wound around a field pole, thereby configuring a rotor. The armature winding 22 is a multi-phase winding (for example, a three-phase winding). The armature winding is wound around an armature core, thereby configuring an armature. The armature winding 22 generates an electromotive force as a result of change in the magnetic field generated by the field winding 21. An alternating current output induced by the armature winding 22 is supplied to the rectifier 20. The rectifier 20 performs full-wave rectification on the alternating current output from the armature winding 22. The output from the rectifier 20 is outputted as the output from the power generator 2 for the vehicle. The output is then supplied to an electrical load 5, via a battery 3, an electrical load switch 4, and the like. The output of the power generator 2 for a vehicle changes depending on the rotation frequency of the rotor and the amount of field current flowing to the field winding 21. The voltage controller 1 for a vehicle is controlled by the field current.

A vehicle-side controller 6, serving as an external controller, is connected to the power generator 2 for a vehicle. The vehicle-side controller 6 controls engine rotation and the like based on a power generator state signal (described in detail hereafter) sent from the voltage controller 1 for a vehicle and other pieces of information.

Next, details of the voltage controller 1 for a vehicle will be described. The voltage controller 1 for a vehicle includes a voltage control circuit 11, a rotation frequency detection circuit 12, a temperature detection circuit 13, a drive duty detection circuit 14, a field current detection circuit 15, an output voltage detection circuit 16, an exponentially weighted moving average circuit 17, a communication control circuit 18, a switching transistor 114, a free-wheeling diode 115, and a shunt resistor 116.

The voltage control circuit 11 includes resistors 111 and 112, and a voltage comparator 113. In the voltage comparator 113, a reference voltage Vref is inputted into a plus input terminal. A detection voltage is inputted into a negative input terminal. The detection voltage is an output voltage of the power generator 2 for a vehicle (B terminal voltage or terminal voltage of the battery 3) divided by a voltage dividing circuit formed by the resistors 111 and 112. Instead of the B terminal voltage being divided, the terminal voltage of the battery 3 can be introduced and divided. The divided terminal voltage can then be applied to the negative input terminal of the voltage comparator 113. The reference voltage Vref can be a constant voltage (such as a value equivalent to a regulated voltage). However, according to the embodiment, to intermittently control the switching transistor 114 at a predetermined period, a reference voltage Vref of which a voltage value periodically changes to form a saw-tooth waveform or a triangular waveform is used (a method of intermittently controlling the switching transistor 114 at a predetermined period is not limited thereto, and other methods can be used). An output terminal of the voltage comparator 113 is connected to the switching transistor 114. In the switching transistor 114, the base is connected to the output terminal of the voltage comparator 113. The collector is connected to the output terminal (B terminal) of the power generator 2 for the vehicle, via the free-wheeling diode 115. The emitter is grounded, via the shunt resistor 116 and a grounding terminal (E terminal). The collector of the switching transistor 114 is also connected to the field winding 21. When the switching transistor 114 is turned ON, the field current flows to the field winding 21. When the switching transistor 114 is turned OFF, the current flow is stopped. The free-wheeling diode 115 is connected in parallel to the field winding 21. When the switching transistor 114 is turned OFF, the free-wheeling diode 115 recirculates the field current flowing to the field winding 21.

The rotation frequency detection circuit 12 detects the rotation frequency of the power generator 2 based on a phase voltage of the armature winding 22 inputted via a P terminal. The temperature detection circuit 13 detects the temperature of the power generator 2 for a vehicle using a predetermined temperature sensor (not shown). The drive duty detection circuit 14 detects the drive duty of the switching transistor 114 as the duty ratio. The field current detection circuit 15 detects the field current flowing to the field winding 21 based on the value of voltage drop in the shunt resistor 116. The output voltage detection circuit 16 detects an output voltage appearing at the B terminal of the power generator 2. Detection values detected (measured) at each detection circuit are inputted into the exponentially weighted moving average circuit 17 as power generator state signals before averaging.

The exponentially weighted moving average circuit 17 performs an EWM averaging process on the power generator state signals respectively inputted from the rotation frequency detection circuit 12, the temperature detection circuit 13, the drive duty detection circuit 14, the field current detection circuit 15, and the output voltage detection circuit 16. An averaged power generator state signal is inputted into the communication control circuit 18 and transmitted to the vehicle-side controller 6 according to a protocol decided with the vehicle-side controller 6.

The above-described switching transistor 114 corresponds to a switching means. The voltage control circuit 11 corresponds to a voltage controlling means. The rotation frequency detection circuit 12, the temperature detection circuit 13, the drive duty detection circuit 14, the field current detection circuit 15, and the output voltage detection circuit 16 correspond with a power generator state signal generating means. The exponentially weighted moving average circuit 17 corresponds to a signal averaging means. The communication control circuit 18 corresponds to a communicating means.

The voltage controller 1 for a vehicle according to the present invention is configured as described above. Next, operations performed from detection to transmission of the power generator state signal will be described. FIG. 2 is a flowchart of operations performed by the voltage controller 1 for a vehicle related to transmission of the power generator state signal.

The rotation frequency detection circuit 12, the temperature detection circuit 13, the drive duty detection circuit 14, the field current detection circuit 15, and the output voltage detection circuit 16 measure the newest power generator state signals V (Step 100). Next, the exponentially weighted moving average circuit 17 performs an EWM averaging using the newest power generator state signals V and calculates a newest average value AV (Step 101). The communication control circuit 18 transmits the newest average value AV towards the vehicle-side controller 6 as an averaged power generator state signal (Step 102). Because the newest average value AV calculated at Step 101 is used in a subsequent averaging process, the newest average value AV is stored in the exponentially weighted moving average circuit 17 (Step 103). The series of operations described above is repeated at a predetermined cycle, preferably the same cycle as the intermittent cycle of the switching transistor 111.

Next, details of the EWM averaging process performed at Step 101 will be described. When the newest power generator state signal obtained by a measuring operation at Step 100 is $V_{n+1}$, the newest average value calculated at Step 101 is $AV_{n+1}$, the average value of a previous cycle recorded at Step 103 is $AV_n$, and the averaging frequency is N, the newest average value $AV_{n+1}$ can be calculated using an equation below.

$$AV_{n+1} = (V_{n+1} + (N-1) \times AV_n)/N$$

Calculation of the newest average value $AV_{n+1}$ at Step 101 is performed using the equation. Storage of the average value at Step 103 is performed by the average value $AV_n$ of the previous cycle being overwritten with the newest average value $AV_{n+1}$.

Averaging described above is equivalent to a moving average of a predetermined number of power generator state signals that are consecutively measured. The predetermined number subjected to the moving average is equivalent to the averaging frequency N. In other words, in the series of operations shown in FIG. 2, an average of measured values of an N-number of newest power generator state signals is calculated. In the next series of operations performed after a return from Step 103 to step 100, an oldest power generator state signal among the previous N-number of power generator state signals is deleted. A power generator state signal obtained by a latest measuring operation is added instead. The average of the measured values of the N-number of newest generator state signals at this point is calculated. The newest average value can be determined by the operation being repeated.

Figure 3:
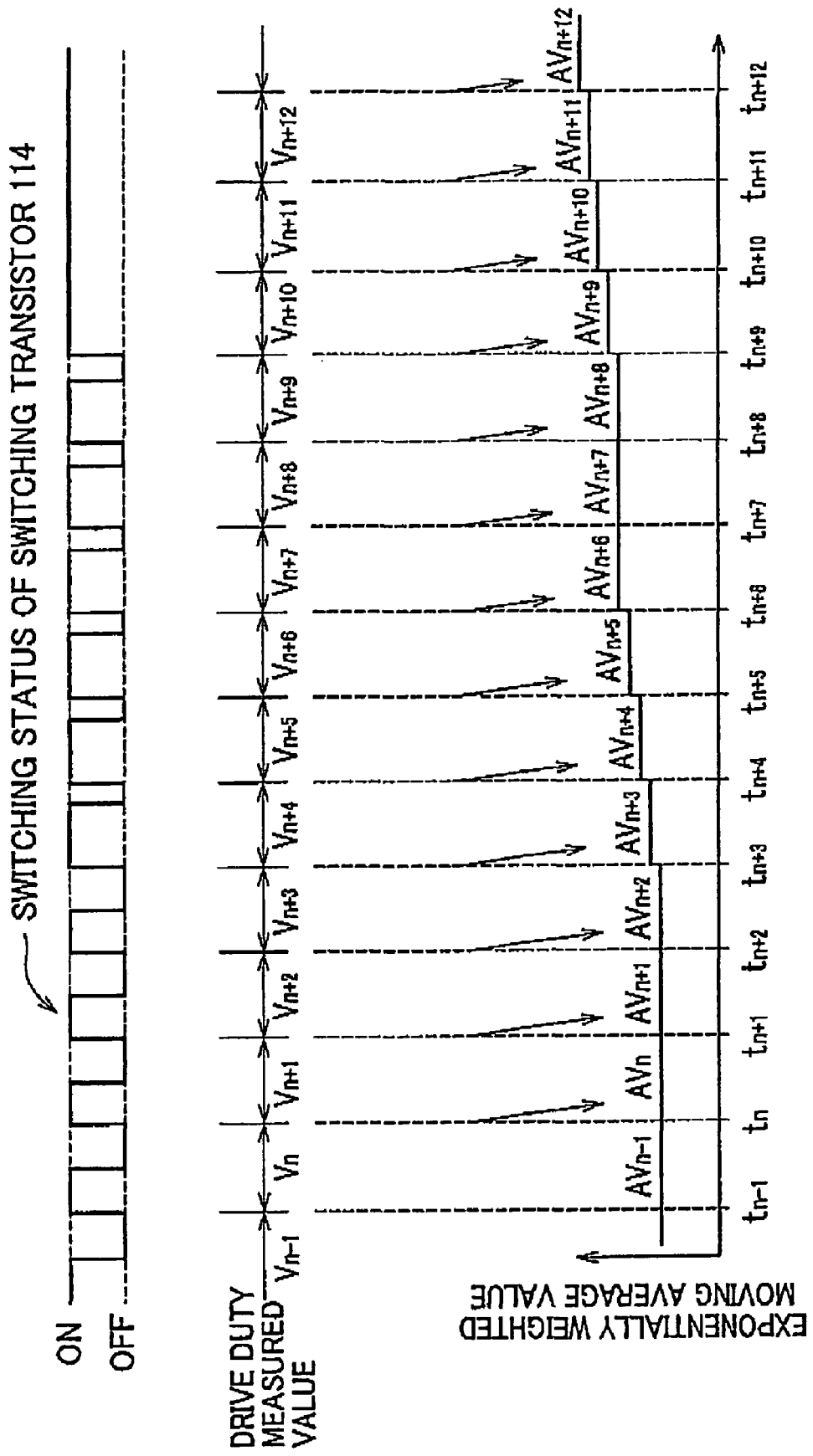
FIG. 3 is an explanatory diagram showing a power generator state signal obtained by an EWM averaging.
Figure 4:
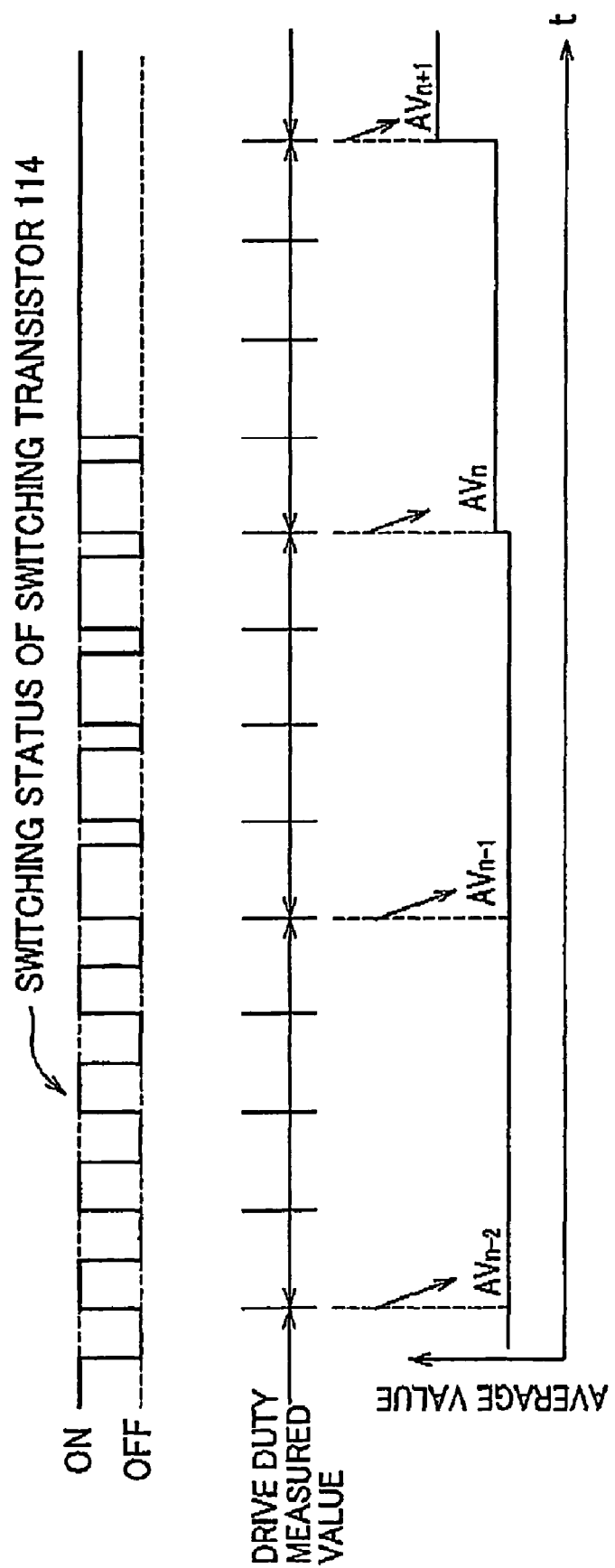
FIG. 4 is an explanatory diagram showing a power generator state signal averaged by a conventional method.

FIG. 3 is an explanatory diagram of the power generator state signal obtained by averaging. In FIG. 3, "drive duty measured value" indicates the drive duty (duty ratio) serving as the power generator state signal measured by the drive duty detection circuit 14. "Average value" indicates the average value calculated by the exponentially weighted moving average circuit 17. A horizontal axis indicates an elapsed time t. FIG. 4 is an explanatory diagram of a power generator state signal averaged by a conventional method.

As shown in FIG. 3, according to the embodiment, a new averaging value is calculated every time a new power generator state signal is measured. On the other hand, as shown in FIG. 4, in the conventional method, an average value (power generator state signal) is calculated every predetermined amount of time (in the example shown in FIG. 4, an amount of time equal to four intermittent cycles of the switching transistor). Therefore, once a power generator state signal is outputted, even when the state of the power generator changes, the change is not reflected in the content of the power generator state signal during the subsequent four cycles.

In this way, according to the voltage controller 1 for a vehicle according to the embodiment, a result obtained by a power generator state signal being averaged is transmitted to the vehicle-side controller 6 as the power generator control signal. Therefore, every time a state of the power generator 2 for a vehicle changes, details of the change can be reflected. Reliability of the power generator control signal can be improved.

As a result of the switching transmitter 114 being intermittently controlled at a predetermined cycle, measurement accuracy of the power generator state signal, contents of which are the duty ratio of the switching transistor 114 and a current value of the current flowing to the field winding 21, can be increased.

The duty ratio and the current value are measured (measurement operation subsequent to $V_{n+10}$ in FIG. 3) and the power generator state signal is generated at the same cycle as the intermittent cycle of the switching transistor 114, regardless of whether intermittent control is actually performed. As a result of the duty ratio and the current value being measured in time with the intermittent cycle of the switching transistor 114, accuracy of these measurements can be further increased.

The present invention is not limited to the above-described embodiment. Various variation embodiments within the scope of the spirit of the present invention are possible. For example, the exponentially weighted moving average circuit 17 can change the averaging frequency N depending on the state of the power generator 2 for a vehicle. As a result, when required response characteristics differ based on the state of the power generator 2 for a vehicle (for example, when the power generator rotation frequency is excessive high or low, or when the power generator temperature is excessive high or low), the averaging frequency can be changed, and a power generator state signal of an appropriate sensitivity can be outputted.

The exponentially weighted moving average circuit 17 can change the averaging frequency N depending on a communication signal sent from the vehicle-side controller 6. For example, the communication signal is received by the communication control circuit 18 or another circuit and inputted into the exponentially weighted moving average circuit 17. As a result, when required response characteristics differ depending on a vehicle state (for example, when an engine rotation frequency is excessively high or low, or when a coolant temperature is excessively high or low; it is assumed that the communication signal sent from the vehicle-side controller 6 includes information on the engine rotation frequency and the coolant temperature), a power generator state signal of an appropriate sensitivity can be outputted by the averaging frequency being changed by an instruction from the vehicle-side controller 6.

The exponentially weighted moving average circuit 17 can set the averaging frequency N to a frequency corresponding to a time constant of the field winding 21. As a result of the averaging frequency of the power generator state signal, contents of which are the duty ratio of the switching transistor 114 and the current value of the current flowing to the field winding 21, being set to a frequency corresponding to the time constant of the field winding 21, a power generator state signal having high measurement accuracy close to actual values can be outputted.

When, in the inputted power generator state signals, the same value continues for a predetermined amount of time or for a predetermined consecutive number of times, the exponentially weighted moving average circuit 17 can output power generator state signals in which the same value is continued, instead of the averaged power generator state signal. As a result, a power generator state signal having high measurement accuracy close to actual values can be outputted by an EWM averaging result being changed to 0% or 100%, when the duty ratio of the switching transistor 114 is averaged and a 0%- or 100%-state continues for a predetermined amount of time or a predetermined consecutive number of times.

What is claimed is:

1. A voltage controller electrically connected to a power generator mounted on a vehicle, the power generator having a field winding electrically connected in series to a switching means and the power generator being connected to a battery, the voltage controller comprising:
    a voltage controlling means for controlling an output voltage of the power generator and a terminal voltage of the battery by intermittently switching the switching means on and off to control an amount of field current flowing through the field winding to control the output voltage of the power generator and the terminal voltage of the battery;
    a signal generating means for generating a power generator state signal by repeatedly measuring a state of the power generator at predetermined measurement periods; and
    a signal averaging means for performing an exponentially weighted averaging of the power generator state signal generated by the signal generating means, wherein
    the signal averaging means executes the weighted averaging within a predetermined averaging period and updates the weighted averaging at each of the predetermined measurement periods,
    the signal generating means generates at least one of a duty ratio of the switching means that is conducted intermittently and a current value of the field current flowing to the field winding as the power generator state signal,
    the switching means is intermittently conducted at a predetermined period, and
    the signal generating means measures one of the duty ratio and the current value and generates the power generator state signal at the predetermined measurement period that is equal to the predetermined period of the switching means, regardless if the switching means is in operation.

2. The voltage controller for a vehicle according to claim 1, wherein
    the signal averaging means changes the predetermined averaging period depending on a state of the power generator for the vehicle.

3. The voltage controller for a vehicle according to claim 1, wherein
    the signal averaging means sets the predetermined averaging period to a period corresponding to a time constant of the field winding.

4. The voltage controller for a vehicle according to claim 1, wherein
    when the power generator state signals generated by the signal generating means have a same value that continues for a predetermined amount of time or a predetermined number of consecutive times, the signal averaging means outputs power generator state signals in which the same value is continued, instead of the weighted averaged power generator state signal.

5. The voltage controller according to the claim 1, further comprising:
    a communicating means for communicating to a vehicle-side controller by using a predetermined protocol enabling a bidirectional communication therebetween, wherein the communication means is adapted to transmit the weighted averaged power generator state signal averaged by the signal averaging means to the vehicle-side controller and receive a communication signal transmitted by the vehicle-side controller.

6. The voltage controller for a vehicle according to claim 5, wherein
    the signal averaging means changes the predetermined averaging period depending on the communication signal transmitted from the vehicle-side controller.

* * * * *